(12) United States Patent
Petermann et al.

(10) Patent No.: US 8,088,182 B2
(45) Date of Patent: Jan. 3, 2012

(54) AZO DYES, A PROCESS FOR THE PREPARATION THEREOF AND THE USE THEREOF

(75) Inventors: Ralf Petermann, Basel (CH); Christian Suppiger, Lucerne (CH); Urs Lauk, Magstatt-le-Haut (FR)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/124,958

(22) PCT Filed: Sep. 23, 2009

(86) PCT No.: PCT/EP2009/062300
§ 371 (c)(1),
(2), (4) Date: Apr. 19, 2011

(87) PCT Pub. No.: WO2010/046192
PCT Pub. Date: Apr. 29, 2010

(65) Prior Publication Data
US 2011/0197377 A1    Aug. 18, 2011

(30) Foreign Application Priority Data
Oct. 21, 2008  (EP) .................................... 08167141

(51) Int. Cl.
*C09B 29/036*   (2006.01)
*C09B 29/045*   (2006.01)

(52) U.S. Cl. ......... 8/690; 8/662; 8/691; 8/920; 534/579; 534/753

(58) Field of Classification Search ............... 8/662, 690, 8/691, 920; 534/579, 753
See application file for complete search history.

(56) References Cited

U.S. PATENT DOCUMENTS
5,298,610 A    3/1994    Hahn et al.

FOREIGN PATENT DOCUMENTS
| DE | 4120362 | 12/1992 |
| FR | 2313430 | 12/1976 |
| GB | 1426740 | 3/1976 |
| GB | 1503130 | * 3/1978 |

* cited by examiner

Primary Examiner — Amina Khan

(57) ABSTRACT

The present invention relates to dyes of formula

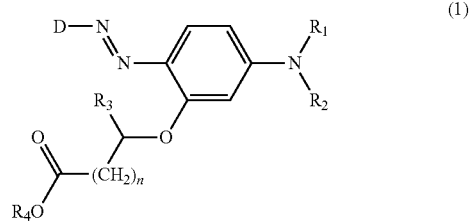

(1)

wherein D, R1, R2, R3, R4 and n are defined as in the claims, to the process for the preparation thereof and to the use thereof in dyeing or printing semi-synthetic and especially synthetic hydrophobic textile materials, more especially textile materials.

9 Claims, No Drawings

AZO DYES, A PROCESS FOR THE PREPARATION THEREOF AND THE USE THEREOF

CROSS REFERENCE TO RELATED APPLICATIONS

This application is the National Phase of International Application PCT/EP2009/062300 filed Sep. 23, 2009 which designated the U.S. and which claims priority to European (EP) patent application 08167141.4 filed Oct. 21, 2008. The noted applications are incorporated herein by reference.

FIELD OF THE INVENTION

The present invention relates to disperse dyes based on phenoxycarboxylic acid esters as coupling component, a process for the preparation of such dyes and to the use thereof in dyeing or printing semisynthetic and especially synthetic hydrophobic fibre materials, more especially textile materials.

BACKGROUND OF THE INVENTION

Disperse azo dyes derived from substituted anilines as coupling component with ester groups in the side chain have been known for a long time and are used in dyeing hydrophobic fibre materials. It has, however, been found that the dyeings or prints obtained using the currently known dyes do not in all cases satisfy today's requirements, especially in respect of light fastness and fastness to washing. There is therefore a need for new dyes that especially have good washing fastness properties.

It has now been found, surprisingly, that the dyes according to the invention meet the criteria given hereinbefore to a considerable degree.

SUMMARY OF THE INVENTION

The present invention accordingly relates to disperse dyes that yield dyeings having a high degree of light fastness and fastness to washing and that, in addition, have good build-up characteristics both in the exhaust and thermosol processes and in textile printing.

The dyes according to the invention correspond to formula

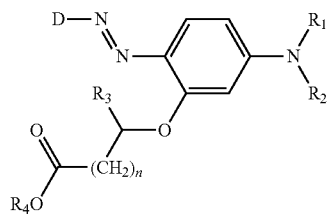

wherein $R_1$ and $R_2$ are each independently of the other hydrogen, vinyl, allyl or $C_1$-$C_6$alkyl which is unsubstituted or substituted by cyano, carboxy, hydroxy, $C_1$-$C_6$alkoxy or $C_6$-$C_{24}$aryl, $R_3$ is hydrogen, $C_1$-$C_6$alkyl or $C_6$-$C_{24}$aryl, $R_4$ is hydrogen, $C_1$-$C_6$alkyl, 2-Cyano-$C_1$-$C_6$alkyl, 2-Alkoxy-$C_1$-$C_6$alkyl, 2-oxo-$C_1$-$C_6$alkyl or $C_6$-$C_{24}$aryl, n is 0, 1 or 2, and D denotes a radical of formula (2), (3), (4), (5), (6) or (7)

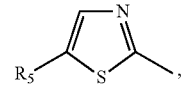

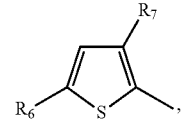

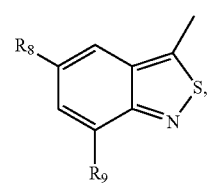

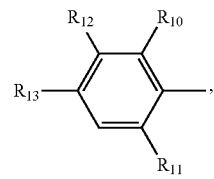

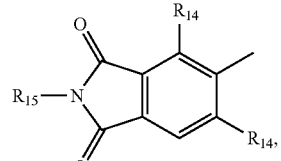

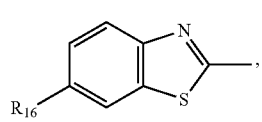

wherein $R_5$ is hydrogen, nitro, cyano or halogen, $R_6$ and $R_7$ are each independently of the other hydrogen, nitro, cyano or halogen, $R_8$ and $R_9$ are each independently of the other hydrogen, nitro, cyano or halogen, $R_{10}$ and $R_{11}$ are each independently of the other nitro, cyano, trifluoromethyl, carboxy, $C_1$-$C_6$alkyl, $C_1$-$C_6$alkoxy, $C_1$-$C_6$acylamino or halogen, $R_{12}$ and $R_{13}$ are each independently of the other hydrogen, nitro, cyano, trifluoromethyl, carboxy, $C_1$-$C_6$alkoxycarbonyl, $C_1$-$C_6$alkylsulfonyl, $C_1$-$C_6$alkylsulfonylamino, $C_1$-$C_6$acylamino or halogen, $R_{14}$ represents nitro, cyano or halogen, $R_{15}$ is $C_1$-$C_6$alkyl, and $R_{16}$ is nitro, cyano, trifluoromethyl, carboxy, $C_1$-$C_6$alkylsulfonyl, $C_1$-$C_6$alkylsulfonylamino, $C_1$-$C_6$acylamino or halogen.

Any radical denoting alkyl may be a straight-chain or branched alkyl radical.

Examples of alkyl groups include methyl, ethyl, n-propyl, isopropyl, n-butyl, isobutyl, sec-butyl, tert-butyl, n-pentyl, isopentyl, neopentyl and n-hexyl.

Substituted alkyl groups include, for example, 2-hydroxyethyl, 2-hydroxypropyl, 4-hydroxybutyl, 2-cyanoethyl, 2-cyanopropyl, 4-cyanobutyl, 2-methoxyethyl, 2-carboxyethyl and 4-methoxybutyl $C_1$-$C_6$alkoxy may be, for example, methoxy, ethoxy, n-propoxy, isopropoxy, n-butoxy, iso-butoxy, sec-butoxy, tert-butoxy, n-pentoxy, neopentoxy or n-hexoxy.

Any radical denoting halogen may be fluorine, chlorine or, preferably, bromine.

$C_6$-$C_{24}$Aryl groups are, for example, phenyl, tolyl, mesityl, isityl, naphthyl and anthryl.

Suitable $C_1$-$C_6$acylamino groups as radical $R_{10}$, $R_{11}$, $R_{12}$, $R_{13}$ or $R_{17}$ are, for example, acetylamino, propionylamino and n-butyrylamino.

The dyes of formula (1) wherein n is 0 or 1, in particular 0, are preferred.

Preference is given to dyes of formula (1) wherein $R_1$ and $R_2$ are ethyl, benzyl or allyl.

$R_3$ is preferably hydrogen.

$R_4$ is preferably methyl.

Preference is given to dyes of formula (1) wherein n is 0, $R_3$ is hydrogen and $R_4$ is methyl.

Further preferred dyes of formula (1) are those wherein D is a radical of formula (2) as defined hereinbefore, wherein $R_5$ is nitro.

Further preferred dyes of formula (1) are those wherein D is a radical of formula (3) as defined hereinbefore, wherein $R_6$ and $R_7$ are nitro.

Likewise, dyes of formula (1) are preferred, wherein D is a radical of formula (4) as defined hereinbefore, wherein $R_8$ is nitro and $R_9$ is hydrogen or bromine.

Furthermore, dyes of formula (1) are preferred, wherein D is a radical of formula (5) as defined hereinbefore, wherein $R_{12}$ and $R_{11}$ are each independently of the other nitro, cyano, trifluoromethyl, methoxy, chlorine or bromine.

Special preference is given to dyes of formula (1), wherein D is a radical of formula (5) as defined hereinbefore, wherein $R_{12}$ is hydrogen or methoxycarbonyl.

Particularly preferred are dyes of formula (1), wherein D is a radical of formula (5) as defined hereinbefore, wherein $R_{13}$ is nitro, cyano, methylsulfonyl or bromine.

Further preferred dyes of formula (1) are those wherein D is a radical of formula (6) as defined hereinbefore, wherein $R_{14}$ represents cyano or bromine.

Moreover, dyes of formula (1) are preferred, wherein D is a radical of formula (7) as defined hereinbefore, wherein $R_{16}$ is nitro or methylsulfonyl.

The present invention also relates to the process for the preparation of an azo dye of formula (1), which comprises diazotizing a compound of formula D-$NH_2$, wherein D is as defined hereinbefore, according to a conventional method and then coupling the diazotized compound with a coupling component of formula (8)

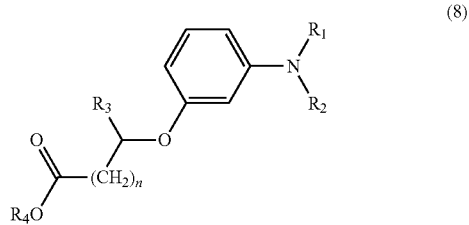

wherein $R_1$, $R_2$, $R_3$, $R_4$ and n are as defined hereinbefore.

The diazotization of the compound of formula D-$NH_2$ is carried out in a manner known per se, for example with sodium nitrite in an aqueous acidic medium, for example an aqueous hydrochloric acid medium or aqueous sulfuric acid medium. The diazotization can, however, also be carried out using other diazotizing agents, for example nitrosylsulfuric acid. An additional acid may be present in the reaction medium in the diazotization procedure, e.g. phosphoric acid, sulfuric acid, acetic acid, propionic acid, hydrochloric acid or a mixture of such acids, for example a mixture of propionic acid and acetic acid. The diazotization is advantageously carried out at temperatures from −10 to +30° C., e.g. from 0° C. to room temperature.

Coupling of the diazotized compound of formula D-$NH_2$ to the coupling component of formula (8) is likewise carried out in known manner, for example in an aqueous acidic medium or aqueous organic medium, advantageously at temperatures from −10 to 30° C., especially below 10° C. The acid used may be, for example, hydrochloric acid, acetic acid, propionic acid, sulfuric acid or phosphoric acid.

The compounds of formula D-$NH_2$ are known or can be prepared in a manner known per se.

The coupling components of formula (8) are likewise known or can be prepared in a manner known per se, for example by reacting 3-nitrophenol with a halogensubstituted carboxylic acid ester at pH>7, followed by reduction of the nitro compound to the corresponding amine, for example with tin, zinc or iron in hydrochloric acid or by hydration with Raney nickel, and, finally, reaction of the unsubstituted amine with alkyl chloride, allyl chloride or benzyl chloride.

The dyes according to the invention may be used for dyeing or printing semi-synthetic and especially synthetic hydrophobic fibre materials, more especially textile materials. Textile materials composed of blend fabrics that comprise such semi-synthetic or synthetic hydrophobic fibre materials can also be dyed or printed using the dyes according to the invention.

Semi-synthetic fibre materials that come into consideration are, especially, cellulose 2½-acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride or on polyamide.

The application of the dyes according to the invention to the fibre materials is effected in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2½-acetate is dyed preferably at from 65 to 85° C. and cellulose triacetate at temperatures of from 65 to 115° C.

The dyes according to the invention will not colour wool and cotton present at the same time in the dyebath or will colour such materials only slightly (very good reservation) so that they can also be used satisfactorily in the dyeing of polyester/wool and polyester/cellulosic fibre blend fabrics.

The dyes according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes according to the invention into a dye preparation prior to use. For this purpose, the dye is ground so that its particle size is on average from 0.1 to 10 microns. Grinding can be carried out in the presence of dispersants. For example, the dried dye is ground together with a dispersant or kneaded into a paste form together with a dispersant and then dried in vacuo or by atomisation. After adding water, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes according to the invention impart to the said materials, especially to polyester materials, level colour shades having very good in-use fastness properties such as, especially, good fastness to light, fastness to heat setting, fastness to pleating, fastness to chlorine, and wet fastness, e.g. fastness to water, to perspiration and to washing; the finished dyeings are further characterised by very good fastness to rubbing. Special emphasis should be given to the good fastness properties of the dyeings obtained with respect to perspiration and, especially, to washing.

The dyes according to the invention can also be used satisfactorily in producing mixed shades together with other dyes.

Furthermore, the dyes and dye mixtures according to the invention are also well suited to dyeing hydrophobic fibre materials from supercritical $CO_2$.

The present invention relates to the above-mentioned use of the dyes according to the invention as well as to a process for the dyeing or printing of semi-synthetic or synthetic hydrophobic fibre materials, especially textile materials, in which process a dye according to the invention is applied to the said materials or incorporated into them. The said hydrophobic fibre materials are preferably textile polyester materials. Further substrates that can be treated by the process according to the invention and preferred process conditions can be found hereinbefore in the more detailed description of the use of the dyes according to the invention.

The invention relates also to hydrophobic fibre materials, preferably polyester textile materials, dyed or printed by the said process.

The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimeters.

I. PREPARATION EXAMPLES

I.1 Synthesis of Precursors (a) 3-Nitrophenoxyacetic acid methylester 300 g of 3-nitrophenol are added to 800 ml of DMF. Then 240 g of sodium carbonate are added portionwise. Subsequently 270 g of chloroacetic acid methylester is added at 22° C. Then the mixture is stirred at 85° C. for six hours. After being cooled down to 25° C. it is given to 3 kg of water and 1 kg of ice. The resulting suspension is filtered off. The filter cake is washed with 300 g of water and dried in vacuum. Yield: 407 g.

(b) 3-Aminophenoxyacetic acid methylester 30 g of 3-methoxycarbonylmethoxyaniline are given into 144 g of hydrochloric acid. Then 40 g of tin granulate and 140 ml of methanol are added. The temperature is held between 40 and 50° C. while cooling with a water bath. After one hour the reaction is complete. It is cooled down to 10° C. and filtered off from unreacted tin. While rapid stirring, a solution of 75 g sodium carbonate in 500 g of water is added whereupon a white suspension is obtained. Than 1000 ml of methanol are added while the temperature is kept between 10 and 15° C. with an ice bath. After stirring for half an hour the suspension is filtered. Methanol is removed from the filtrate in vacuum. The liquid residue is extracted three times with 150 ml ethyl acetate. The organic layer is dried with sodium sulfate and the solvent is removed in vacuum. Yield: 18 g.

(c) 3-Diallylaminophenoxyacetic acid methylester 22 g of 3-aminophenoxyacetic acid methylester are solved in 63 g allyl bromide. Subsequently, 10 g of sodium carbonate are added portionwise and the temperature is raised to 45° C. The reaction mixture is stirred at this temperature for 4.5 hours. The insoluble salt is filtered off and washed with 70 g of ethyl acetate. The combined filtrates are kept at 5° C. for 12 h. After the extraction with water, the organic phase is dried with sodium sulfate and the solvent is removed in vacuum (60° C., 28 mbar). Yield: 24 g (dark oil).

(d) 3-Dibenzylaminophenoxyacetic acid methylester 10 g of 3-aminophenoxyacetic acid methylester are solved in 19 g benzyl chloride. Subsequently, 14 g of sodium carbonate are added portionwise and the temperature is raised to 100° C. The reaction mixture is stirred at this temperature for 3 hours. The insoluble salt is filtered off and washed with 100 ml of ethyl acetate. The combined filtrates are kept at 5° C. for 12 h. After the extraction with water and brine, the organic phase is dried with sodium sulfate and the solvent is removed in vacuum (50° C., $10^{-2}$ mbar). Yield: 22 g (dark oil).

(e) 3-Diethylaminophenoxyacetic acid methylester 14 g of 3-aminophenoxyacetic acid methylester are solved in 20 ml DMF. Subsequently, 18 g of sodium carbonate are added portionwise, the temperature is raised to 50° C. and 38 g of diethyl sulfate are added. The reaction mixture is stirred at 60 to 65° C. for one hour. The insoluble salt is filtered off and washed with 75 g of ethyl acetate. After the extraction with brine, the organic phase is dried with sodium sulfate and the solvent is removed in vacuum (60° C., 80 mbar). Yield: 15 g (dark oil).

I.2 Dyestuff of Formula (101)

14 g of sulfuric acid (97%) are added to 11.5 g of ice. After the solution has cooled down to 20° C., 3.4 g of 2-amino-3-chlor-5-nitrobenzonitrile is added. Subsequently, 3.4 g of nitrosyl sulfuric acid (40% in sulfuric acid) are added while the reaction mixture is cooled. Then the mixture is stirred for two hours at 20° C. and cooled down to 5° C. before coupling.

A solution of the coupling component is prepared by addition of 4.6 g of sulfuric acid and 4.5 g of 3-diallylaminophenoxyacetic acid methylester to 50 ml water. Afterwards, 9.3 g of acetic acid, 2.6 g of a solution (10%) of sulfamic acid and 22 g of ice are added, followed by the addition of the solution of the diazonium salt. The temperature is held between 4 and 8° C. while adding 46 g of ice and afterwards the reaction mixture is allowed to grow warm to 20° C. It is stirred for 22 hours at room temperature, filtered and washed until it becomes neutral. The wet filter cake (32 g) is given to 57 g water. 137 mg of Surfynol 104E and acetic acid are added in an amount to adjust the pH value between 3 and 4. The mixture is stirred at 95° C. for six hours.

Subsequently, the hot solution is filtered off and the filter cake is dried in vacuum.

Yield: 5.8 g of the dye of formula (101);

wavelength of the absorption maximum $\lambda_{max}$=558 nm

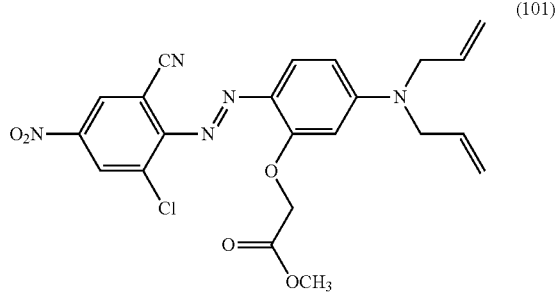

(101)

I.2 Dyestuff of Formula (102)

3.9 g of 2-amino-3,5-dinitrothiophene are dissolved in 30 g sulfuric acid (97%). Then 3.9 g of nitrosyl sulfuric acid (40% in sulfuric acid) are added at 0-5° C. The mixture is stirred for four hours at this temperature.

A solution of the coupling component is prepared by addition of 5.3 g of 3-diallylaminophenoxyacetic acid methylester and 5.5 g of sulfuric acid (97%) to 65 g of water. After cooling to 0° C., the diazonium salt solution is added at 0-5° C. within 30 minutes. The reaction mixture is stirred for 17 hours while it is allowed to warm to 15° C. Then it is filtered and washed with water until the filtrate becomes colorless. The wet filter cake (13 g) is given to 40 g water. 0.1 g of Surfynol 104E and acetic acid are added in an amount to adjust the pH value between 3 and 4. The mixture is stirred at 95° C. for one hour. Then the hot solution is filtered off and the filter cake is dried in vacuum.

Yield: 9 g of the dye of formula (102); $\lambda_{max}$=640 nm

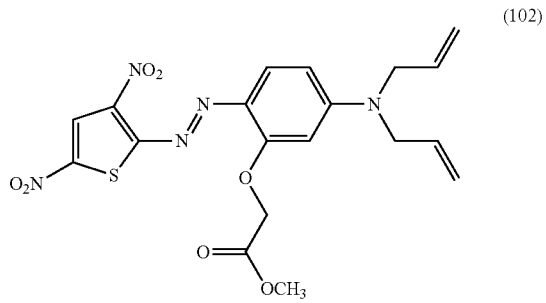

(102)

I.2 Dyestuff of Formula (103)

3.9 g of 3-amino-5-nitrobenzoisothiazol are dissolved in 15 g sulfuric acid (97%). Then 5.0 g of nitrosyl sulfuric acid (40% in sulfuric acid) are added at 0-5° C. The mixture is stirred for four hours at this temperature.

A solution of the coupling component is prepared by addition of 3.7 g of 3-diethylaminophenoxyacetic acid-methylester and 4.0 g of sulfuric acid (97%) to 45 g of water. After cooling to 0° C., the diazonium salt solution is added at 0-5° C. and at a pH value between 0.8 and 1.4 (addition of sodium acetate). The reaction mixture is stirred for 17 hours while it is allowed to grow warm to 15° C. Then it is filtered and washed with water until the filtrate becomes colorless. The wet filter cake (13 g) is given to 100 g water. 0.1 g of Surfynol 104E and acetic acid are added in an amount to adjust the pH value between 3 and 4. The mixture is stirred at 95° C. for one hour. Then the hot solution is filtered off and the filter cake is dried in vacuum.

Yield: 4 g. of the dye of formula (103); $\lambda_{max}$=626 nm.

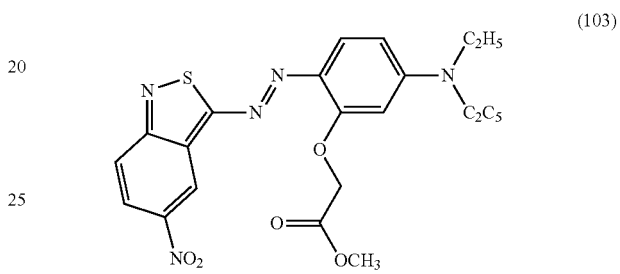

(103)

Analogously to Example 1.1 the azo dyes listed in Table 1 can be prepared.

TABLE 1

Dyes of formula (1a)

| Compound | $R_1$ | $R_2$ | $R_{10}$ | $R_{11}$ | $R_{13}$ | $\lambda_{max}$/nm |
|---|---|---|---|---|---|---|
| 104 | allyl | allyl | Br | Br | $NO_2$ | 440 |
| 105 | allyl | allyl | CN | CN | $NO_2$ | 578 |
| 106 | allyl | allyl | CN | $CF_3$ | $NO_2$ | 572 |
| 107 | allyl | allyl | Br | Br | $SO_2CH_3$ | 418 |
| 108 | allyl | allyl | CN | CN | $SO_2CH_3$ | 561 |
| 109 | benzyl | benzyl | Br | Br | $NO_2$ | 422 |
| 110 | benzyl | benzyl | CN | CN | $NO_2$ | 568 |
| 111 | ethyl | ethyl | Br | Br | $NO_2$ | 443 |
| 112 | ethyl | ethyl | CN | CN | $NO_2$ | 584 |
| 113 | ethyl | ethyl | CN | $CF_3$ | $NO_2$ | 578 |
| 114 | ethyl | ethyl | CN | Cl | $NO_2$ | 556 |

TABLE 2

Dyes of formula (1b)

(1b)

| Compound | $R_1$ | $R_2$ | $\lambda_{max}$/nm |
| --- | --- | --- | --- |
| 115 | benzyl | benzyl | 634 |
| 116 | ethyl | ethyl | 644 |

TABLE 3

Dyes of formula (1c)

(1c)

| Compound | $R_1$ | $R_2$ | $\lambda_{max}$/nm |
| --- | --- | --- | --- |
| 117 | allyl | allyl | 606 |
| 118 | benzyl | benzyl | 598 |
| 119 | ethyl | ethyl | 610 |

TABLE 4

Dyes of formula (1d)

(1d)

| Compound | $R_1$ | $R_2$ | $R_9$ | $\lambda_{max}$/nm |
| --- | --- | --- | --- | --- |
| 120 | ally | allyl | H | 618 |
| 121 | benzyl | benzyl | H | 612 |
| 122 | allyl | allyl | Br | 630 |
| 123 | benzyl | benzyl | Br | 626 |
| 124 | ethyl | ethyl | Br | 637 |

TABLE 5

Dyes of formula (1e)

(1e)

| Compound | $R_1$ | $R_2$ | $R_{14}$ | $\lambda_{max}$/nm |
| --- | --- | --- | --- | --- |
| 125 | allyl | allyl | Br | 474 |
| 126 | benzyl | benzyl | Br | 471 |
| 127 | ethyl | ethyl | Br | 477 |
| 128 | allyl | allyl | CN | 573 |
| 129 | benzyl | benzyl | CN | 566 |
| 130 | ethyl | ethyl | CN | 581 |

TABLE 6

Dyes of formula (1f)

(1f)

| Compound | $R_1$ | $R_2$ | $R_{16}$ | $\lambda_{max}$/nm |
| --- | --- | --- | --- | --- |
| 131 | allyl | allyl | $NO_2$ | 553 |
| 132 | benzyl | benzyl | $NO_2$ | 544 |
| 133 | ethyl | ethyl | NO2 | 562 |
| 134 | allyl | allyl | $SO_2CH_3$ | 525 |
| 135 | benzyl | benzyl | $SO_2CH_3$ | 518 |
| 136 | ethyl | ethyl | $SO_2CH_3$ | 527 |

II. APPLICATION EXAMPLES

II.1: Dyeing of Polyester 1 part by weight of the dye of formula (101) prepared in Example 1.1 is milled together with four parts of a commercially available dispersing agent and 15 parts of water. Using that formulation, a 1% dyeing (based on the dye and the substrate) is produced on woven polyester by high temperature exhaust process at 130° C.

Test results: the light fastness of the dyeing is excellent as well as the results in the AATCC 61 and ISO 105 tests. The build up properties of the dye are very good.

II.2: Dyeing of Polyester

Example II.1 is repeated by using the dyes of formulae (102)-(136) instead of the dye of formula (101). The build up properties of the dyes are very good and the dyeings exhibit good light fastness and very good results in the AATCC 61 and ISO 105 tests.

What is claimed is:

1. A dye of formula

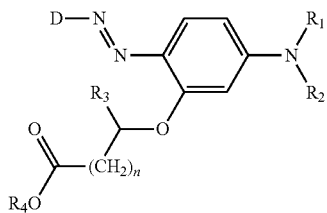

wherein $R_1$ and $R_2$ are each independently of the other hydrogen, vinyl, allyl or $C_1$-$C_6$ alkyl which is unsubstituted or substituted by cyano, carboxy, hydroxy, $C_1$-$C_6$ alkoxy or $C_6$-$C_{24}$ aryl, $R_3$ is hydrogen, $C_1$-$C_6$ alkyl or $C_6$-$C_{24}$ aryl, $R_4$ is hydrogen, $C_1$-$C_6$ alkyl 2-Cyano-$C_1$-$C_6$ alkyl, 2-Alkoxy-$C_1$-$C_6$ alkyl, 2-Oxo-$C_1$-$C_6$ alkyl or $C_6$-$C_{24}$ aryl, n is 0, 1 or 2, and D denotes a radical of formula (3), (4), or (6)

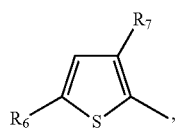

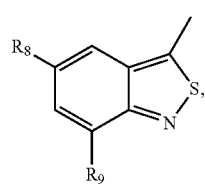

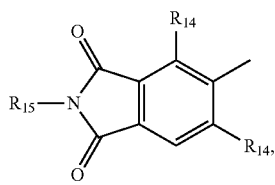

wherein $R_6$ and $R_7$ are each independently of the other hydrogen, nitro, cyano or halogen, $R_8$ and $R_9$ are each independently of the other hydrogen, nitro, cyano or halogen, $R_{14}$ represents nitro, cyano or halogen, and $R_{15}$ is $C_1$-$C_6$ alkyl.

2. A dye of formula (1) according to claim 1, wherein $R_1$ and $R_2$ are ethyl, benzyl or allyl.

3. A dye of formula (1) according to either claim 1, wherein n is 0, $R_3$ is hydrogen and $R_4$ is methyl.

4. A dye of formula (1) according to claim 1, wherein D is a radical of formula (3) as defined in claim 1, and wherein $R_6$ and $R_7$ are nitro.

5. A dye of formula (1) according to claim 1, wherein D is a radical of formula (4) as defined in claim 1, and wherein $R_8$ is nitro and $R_9$ is hydrogen or bromine.

6. A dye of formula (1) according to claim 1, wherein D is a radical of formula (6) as defined in claim 1, and wherein $R_{14}$ represent cyano or bromine.

7. A process for the preparation of an azo dye of formula (1) according to claim 1, which comprises diazotizing a compound of formula D-$NH_2$, wherein D is as defined in claim 1 and then coupling the diazotized compound with a coupling component of formula (8)

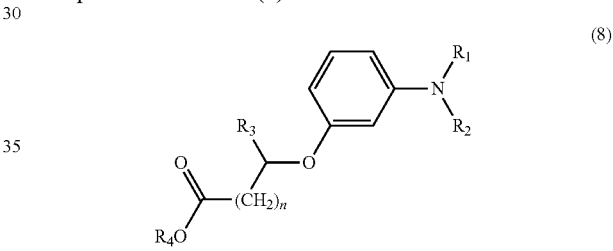

wherein $R_1$, $R_2$, $R_3$, $R_4$ and n are as defined in claim 1.

8. A process for dyeing or printing semi-synthetic or synthetic hydrophobic fibre materials, in which process a dye of formula (1) according to claim 1 is applied to the said materials or incorporated into them.

9. A semi-synthetic hydrophobic fibre material, dyed or printed by the process according to claim 8.